(12) United States Patent  
Stenta

(10) Patent No.: US 6,376,952 B1
(45) Date of Patent: Apr. 23, 2002

(54) BEARING SYSTEM FOR A ROTATING SHAFT

(75) Inventor: Christopher Scott Stenta, North East, MD (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/350,351

(22) Filed: Jul. 14, 1999

(51) Int. Cl.[7] .............................. H02K 5/16; H02K 1/04; F16C 33/02; F16C 27/00; F16C 23/04
(52) U.S. Cl. ....................... 310/90; 310/43; 384/295; 384/215; 384/217; 384/192; 384/202
(58) Field of Search ................................ 310/90, 93, 89; 384/295, 296, 276, 289, 290, 215, 217, 435, 192, 202

(56) References Cited

U.S. PATENT DOCUMENTS

| | | | |
|---|---|---|---|
| 2,295,139 A | | 9/1942 | Topanelian, Jr. |
| 3,897,983 A | | 8/1975 | Hindle |
| 3,909,087 A | | 9/1975 | Cairns ........................ 308/238 |
| 4,014,596 A | * | 3/1977 | Kazama ....................... 308/72 |
| 4,111,499 A | | 9/1978 | McCloskey ................... 308/72 |
| 4,357,552 A | | 11/1982 | MacMillan ................... 370/90 |
| 4,368,931 A | * | 1/1983 | Casler et al. ................ 384/192 |
| 4,532,054 A | | 7/1985 | Johnson ...................... 252/12.4 |
| 4,714,450 A | * | 12/1987 | Byrnes et al. ................. 464/90 |
| 4,726,694 A | | 2/1988 | McFarlin et al. ............. 384/119 |
| 5,040,906 A | | 8/1991 | Zornes ........................ 384/551 |
| 5,145,265 A | | 9/1992 | Flem .......................... 384/296 |
| 5,236,784 A | | 8/1993 | Kobayashi et al. .......... 428/408 |
| 5,287,030 A | | 2/1994 | Nutter ......................... 310/89 |
| 5,509,738 A | | 4/1996 | Haynes et al. ............... 384/275 |
| 5,577,847 A | | 11/1996 | Nakamura et al. ........... 384/517 |
| 5,707,718 A | | 1/1998 | Matsukawa et al. ......... 428/218 |
| 5,811,902 A | * | 9/1998 | Sato ............................ 310/90 |
| 5,866,647 A | | 2/1999 | Massey et al. ............... 524/494 |
| 5,887,982 A | | 3/1999 | Wilcher ....................... 384/97 |
| 5,917,258 A | * | 6/1999 | Kershaw et al. .............. 310/51 |
| 5,945,756 A | * | 8/1999 | Periyathamby et al. ....... 310/89 |

FOREIGN PATENT DOCUMENTS

| | | |
|---|---|---|
| CH | 306441 | 4/1955 |
| DE | 399089 | 7/1924 |
| DE | 2342747 | 3/1975 |
| EP | 0558269 | 9/1993 |
| JP | 62132960 | 6/1987 |
| JP | 07217573 | 8/1995 |
| JP | 09236128 | 9/1997 |

OTHER PUBLICATIONS

PCT INTERNATIONAL SEARCH REPORT, dated Oct. 25, 2000.

* cited by examiner

Primary Examiner—Nestor Ramirez
Assistant Examiner—Dang Dinh

(57) ABSTRACT

A floating bearing system comprising a bearing supported in a clearance fit within a bearing bracket, for example for use in fractional horsepower shaded pole type electric motors. The bearing system is self aligning, to compensate for deviations in the axial alignment of the rotor shaft. A rotation lock restrains the bearing against rotation within the bearing receptacle while allowing the bearing to settle into proper alignment with the rotor shaft by automatically shifting the pitch of the axis of the bearing. In the preferred embodiment the bracket is composed of an engineering plastic and the bearing is composed of a high performance plastic polymer, so that the bearing system is non-lubricating. In the preferred embodiment the bearing bracket is provided with retaining fingers which hold the bearing in place during the assembly and working life of the motor.

31 Claims, 3 Drawing Sheets

BEARING SYSTEM FOR A ROTATING SHAFT

FIELD OF THE INVENTION

This invention relates to bearings. In particular, this invention relates to a bearing system for a rotating shaft, and a bearing and bearing bracket therefor.

BACKGROUND OF THE INVENTION

Small fractional horsepower "shaded pole" type motors are used in many applications, for example to provide air circulation in refrigeration systems. As is well known, shaded pole electric induction motors have a rotor comprising a rotor body bearing a shaft in rotationally fixed relation to the body. The rotor body is rotationally disposed within an opening in a magnetic stator assembly typically formed from a stack of aligned annular stator laminations. Electric field windings surrounding a portion of the stator magnetize the stator laminations to provide the required magnetic motive force for driving the rotor. In an air circulation system an impeller is mounted on the rotor shaft to drive the air flow.

In a conventional shaded pole motor the rotor shaft extends through a housing comprising brackets extending over each end of the rotor opening and secured, usually bolted, to the stator. The housing restrains the rotor body against substantial axial displacement relative to the stator, and supports bearings which maintain the axial alignment of the rotor shaft. The bearings thus maintain stability and alignment of the rotor while allowing for substantially free rotation of the rotor shaft. One example of such a motor is described in U.S. Pat. No. 5,287,030 issued Feb. 15, 1994 to Nutter, which is incorporated herein by reference.

Such fractional horsepower motors are particularly suitable for applications in which the motor runs for extended intervals over a prolonged period, which may be many years. As such the motor must be extremely durable, highly resistant to failure and preferably requires little maintenance over its useful life. The components which tend to be most problematic in achieving these parameters are the bearings, which are subject to persistent frictional contact with the rotating shaft over the life of the motor.

To maintain proper alignment of the rotor shaft, shaded pole type motors typically utilize spherical diameter, oil impregnated powdered metal bearings or ball bearings held in place by die cast aluminum or zinc bearing brackets. These types of bearings require constant exposure to a lubricant, which substantially limits the life of the motor. This problem is particularly acute in high temperature environments in which the oil used to lubricate the bearings dissipates over time, eventually causing catastrophic failure of the bearing system.

It is also known to press fit journal bearings tightly to the bearing brackets. However, this type of bearing system requires machining after the press fitting operation, which significantly increases the manufacturing cost of the motor. Moreover, although a press fit journal bearing will remain in place in the bearing bracket during assembly, due to the interference fit between the bearing and the housing, the performance of the motor at times may be less than optimum because the fixed position of the bearing does not allow for even slight deviations in rotor shaft alignment. If the motor is jarred or bumped during operation, severe vibration and squealing can result because the bearing is not capable of self alignment.

These problems are particularly acute in the case of metal bearings supported by metal brackets, and precision machining of these components is therefore critical. There are bearing systems which use a plastic bracket to support a metal bearing tightly fitted to the bracket in an interference fit, however in these systems adequate lubrication of the bearing remains critical to the proper operation of the motor. It is also known to use a plastic bearing press fitted into a metal bracket, but as the bearing is mounted the bracket closes the bearing inside diameter by the extent of the interference fit, which then necessitates precision machining of the inside diameter to restore adequate clearance for the rotor shaft. Also, the press fit operation causes the bearing to lose alignment during installation.

The design described in U.S. Pat. No. 5,287,030 uses a plastic bearing press fitted to a plastic bracket. However, this design gives rise to the same disadvantages of other bearing systems in which the bearing is mounted in an in interference fit, most notably the inability of the bearing to self align, which reduces the useful life of the motor and generally causes the motor to operate less efficiently over time.

SUMMARY OF THE INVENTION

The present invention provides a floating bearing system comprising a bearing supported in a clearance fit within a bearing bracket, for example for use in fractional horsepower shaded pole type electric motors. The bearing system is self aligning, and thus compensates for deviations in the axial alignment of the rotor shaft to maintain the optimum efficiency of the motor and reduce wear on the bearing, extending the life of the bearing system.

In the preferred embodiment both the bracket and bearing are composed of a non-metallic material, preferably plastic. The bearing may be composed of a high performance plastic which does not require lubrication, to prolong the life of the motor. Other aspects of the invention may be implemented in a bearing system that utilizes a metal bracket and/or a metal bearing.

In the preferred embodiment of the invention the flange portion of a flanged or bushing type bearing is provided with an opening having a bearing surface complimentary to the rotor shaft. A bearing bracket is provided with a bearing receptacle adapted to receive the hub of the bearing in a clearance fit. A rotation lock, in the preferred embodiment flats distributed about the bearing receptacle cooperating with complimentary flats in the hub portion of the bearing, restrains the bearing against rotation within the bearing receptacle while allowing the bearing to settle into proper alignment with the rotor shaft by automatically shifting the centerline or pitch of the axis of the bearing. The bearing is thus retained in the bearing receptacle in "floating" relation and is able to self align to accommodate deviations in the axial pitch of the rotor shaft.

In the preferred embodiment the bearing bracket is provided with bearing retainers comprising retaining fingers that hold the bearing in place during the assembly and working life of the motor. The retaining fingers are preferably formed integrally with the bearing bracket and provided with barbed flanges that retain the bearing in the bearing receptacle in a clearance fit. This aspect of the invention simplifies the assembly of the bearings into the bearing brackets and assembly of the bearing brackets to the motor.

The present invention thus provides a bearing system for a rotating shaft, comprising a bearing comprising an opening having at least one bearing surface, a bearing bracket comprising a receptacle for mounting the bearing on the bracket in substantially fixed relation, the receptacle being dimensioned to support the bearing in a clearance fit, and a rotation lock cooperating between the bearing and the receptacle to restrain the bearing against substantial rotation relative to the bracket, whereby when the shaft is disposed through the bearing the shaft rotates against the bearing surface to maintain the shaft in a substantially fixed radial position, a clearance between the bearing and the bearing receptacle thereby enabling the bearing to maintain alignment with an axial orientation of the shaft.

The present invention further provides a fractional horsepower motor, comprising a rotor rotationally disposed in a stator, stator windings disposed about the stator for driving the rotor and a rotating shaft rotationally fixed to the rotor, and a bearing system comprising a bearing having an opening with at least one bearing surface, disposed in substantially fixed relation in a bearing receptacle supported by a bearing bracket, the receptacle being dimensioned to support the bearing in a clearance fit, and a rotation lock cooperating between the bearing and the receptacle to restrain the bearing against substantial rotation relative to the bracket, whereby when the shaft is disposed through the bearing the shaft rotates against the bearing surface to maintain the shaft in a substantially fixed radial position, a clearance between the bearing and the bearing receptacle thereby enabling the bearing to maintain alignment with an axial orientation of the shaft.

The present invention further provides, in combination, a bearing and a bearing retainer, the bearing being composed of plastic and comprising a flange projecting radially from a hub, the bearing comprising an opening having at least one bearing surface and a first component of a rotation lock, and the bearing bracket comprising a receptacle dimensioned to support the bearing in a clearance fit for mounting the bearing on the bracket in substantially fixed relation, and a second component of a rotation lock such that the first component cooperates with the second component to restrain the bearing against substantial rotation relative to the bracket, whereby when a shaft is disposed through the bearing and rotates against the bearing surface, the bearing maintains the shaft in a substantially fixed radial position, wherein a clearance between the bearing and the bearing receptacle enables the bearing to maintain alignment with an axial orientation of the shaft.

In a further aspect of the invention the bearing is composed of a polymeric plastic and comprises a flange projecting radially from a hub.

In a still further aspect of the invention the bracket comprises a bearing retainer for retaining the bearing in the receptacle. The bearing retainer may comprise retaining fingers projecting from the bearing bracket about the receptacle and adapted to retain the flange of the bearing. In the preferred embodiment the bearing fingers each comprise an arm supported by a spring loop to increase a resilience of the retaining fingers, which terminate in barbed tips.

In a still further aspect of the invention the bearing bracket is composed of plastic and the retaining fingers are formed integrally with the bearing bracket.

BRIEF DESCRIPTION OF THE DRAWINGS

In drawings which illustrate by way of example only preferred embodiments of the invention.

DETAILED DESCRIPTION OF THE INVENTION

Figure 1:
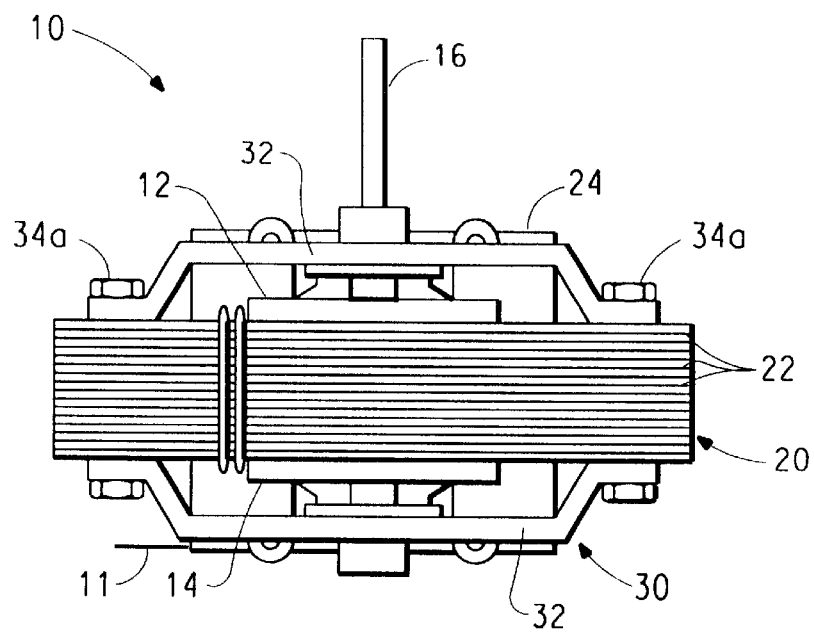
FIG. 1 is a front elevation of a motor embodying the invention.
Figure 2:
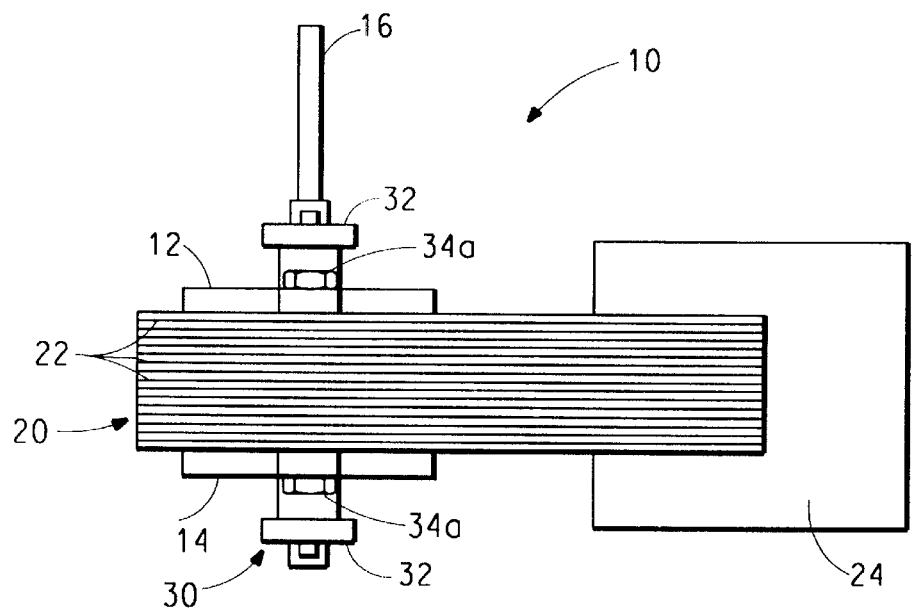
FIG. 2 is a side elevation of the motor of FIG. 1.

FIGS. 1 and 2 illustrate an electric motor 10 embodying one preferred embodiment of the invention. The motor 10 is a fractional horsepower "shaded pole" type motor such as that used to provide air circulation in a refrigeration system. The motor 10 comprises a rotor 12 comprising a rotor body is 14 bearing a shaft 16 in rotationally fixed relation to the body 14. The rotor body 14 is rotationally disposed within an opening in a magnetic stator assembly 20 formed from a stack of aligned annular stator laminations 22. Electric field windings 24 wound around a portion of the stator 20 magnetize the stator laminations 22 to provide the required magnetic motive force for driving the rotor 12.

Figure 3:
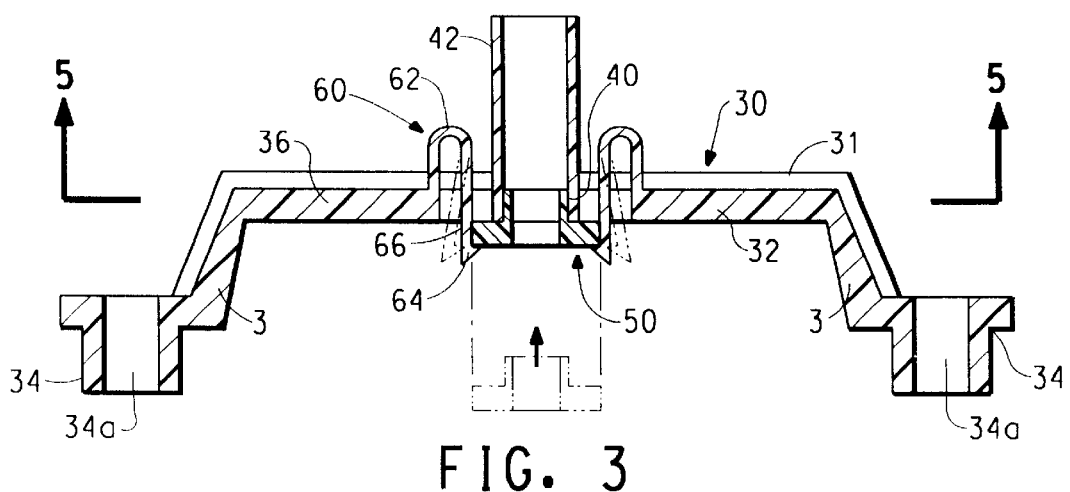
FIG. 3 is a cross-sectional elevation of a bearing system according to the invention.

According to the invention, the rotor shaft 16 extends through a bearing system, a preferred embodiment of which is illustrated in FIG. 3. A housing 30 comprises opposed bearing brackets 32 which extend radially across the ends of the rotor opening and are affixed to the stator 20, for example by bolts 34a. The bearing brackets 32 each support bearings 50 through which the rotor shaft 16 extends to stabilize and maintain proper alignment of the rotor 12 while allowing substantially free rotation of the rotor shaft 16 within the housing 30.

Figure 4:
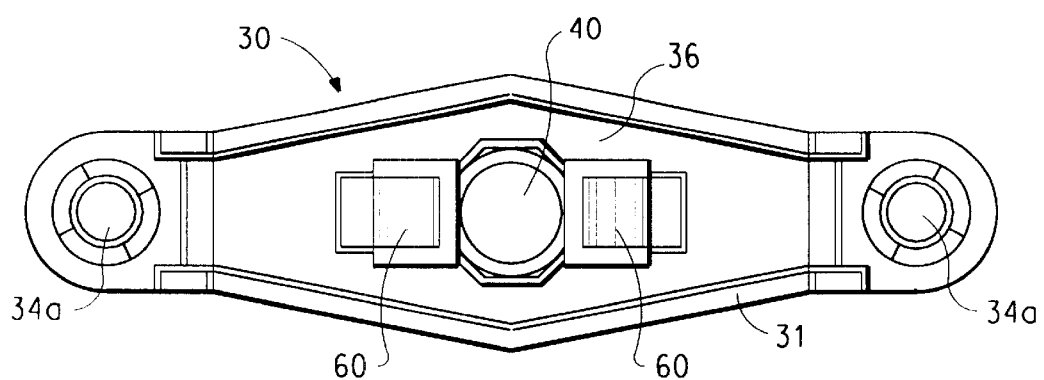
FIG. 4 is a plan view of the bearing bracket in the system of FIG. 3.
Figure 5:
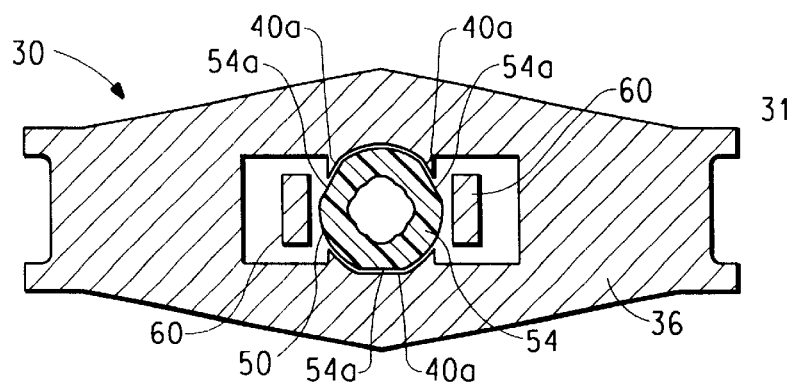
FIG. 5 is a cross-section of the bearing bracket along the line 5—5 in FIG. 3.

The preferred embodiment of the bearing brackets 32 is illustrated in detail in FIGS. 3 to 5. Feet 34 are each provided with a hole 34a through which bolt 34a is disposed to anchor the bracket 32 to the stator 20. A bridge 36 is maintained spaced from the stator 20 by risers 38, which may be oriented obliquely relative to the bridge 36. The bridge 36 is provided with a bearing receptacle 40 comprising a hole extending through the bridge 36, preferably centrally, and dimensioned to receive the bearing 50 in a clearance fit, as described in detail below. The bearing receptacle 40 may optionally include an annular extension 42, as in the embodiment shown, to accommodate a larger bearing 50 and/or serve as a spacer for an impeller (not shown).

In the preferred embodiment the bearing bracket 32 is integrally molded from an engineering plastic. An engineering plastic suitable for the bearing bracket 32 is HTN ZYTEL® (Trademark)51G35 HSL nylon manufactured by DuPont (Trademark). Other suitable materials include PPA, PBT/PET/PTT polyesters, SPS, PPS, LCP, modified polyphenylene oxide, polycarbonates, polyethylene and polypropylene. In the engineering plastic embodiment illustrated, reinforcing ridges 31 are provided about the periphery of the bracket to impart rigidity to the bridge 36 and risers 38. Other materials, for example metals conventionally used in shaded pole motor housings, are also suitable for the bearing bracket 32.

Figure 6:
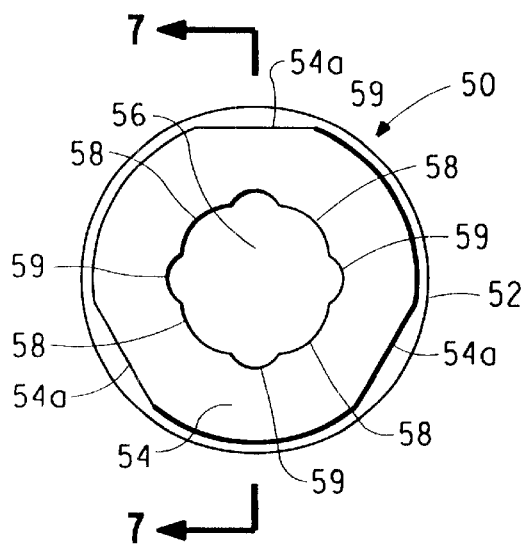
FIG. 6 is a plan view of the bearing in the bearing system of FIG. 3.
Figure 7:
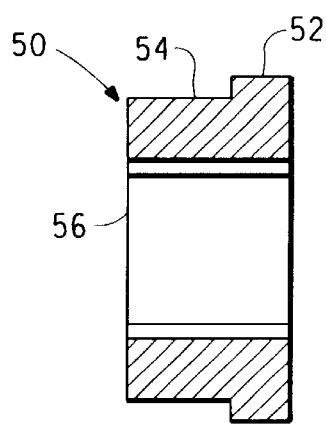
FIG. 7 is a cross-section of the bearing of FIG. 6.

Each bearing bracket 32 supports a bearing 50, a preferred embodiment of which is illustrated in detail in FIGS. 6 and 7. The bearing 50 in the preferred embodiment comprises a flange 52 extending radially from a hub 54. A hole 56 disposed axially through the bearing 50 is provided with one or more bearing surfaces 58 which contact the rotor shaft 16. In the embodiment shown the bearing opening is "fluted", comprising a plurality of truncated bearing surfaces 58 evenly distributed about the hole 56 and spaced apart by lobes 59 which are spaced from the shaft 16. This minimizes the area of contact between the bearing 50 and the shaft 16 to reduce the degree of friction between the rotor shaft 16 and the bearing 50, and thus reduce the heat generated during operation. The lobes 59 also provide a channel or pocket for the accumulation of debris during operation of the motor 10.

In the preferred embodiment the bearings 50 are molded from a high performance polymeric plastic. One preferred bearing material is Vespel® (Trademark) SP-2624 grade manufactured by DuPont (Trademark), due to its superior wear characteristics and extremely low coefficient of thermal expansion properties.

The bearing 50 is dimensioned to nest in the bearing receptacle 40 with a small amount of clearance between the outer surface of the hub 54 and the inner surface of the receptacle 40, to allow for self alignment of the bearing. The clearance between the hub 54 and the receptacle 40 may range between 0.001 inches and 0.003 inches. Too little clearance will interfere with self alignment of the bearing 50, while excessive clearance can cause rattling of the bearing 50 in the bearing bracket 32. Use of the Vespel® (Trademark) SP-2624 polymer is advantageous because it can be manufactured to very close tolerances (as low as 0.0005 inches for small diameters) with no machining required, thereby minimizing manufacturing costs.

A rotation lock is provided to restrain the bearing 50 against substantial rotation within the receptacle 40. In the preferred embodiment the rotation lock comprises flats 54a disposed about the outer surface of the hub 54, and complimentary flats 40a distributed about the bearing receptacle 40 cooperating with the flats 54a, as best seen in FIG. 5. The rotation lock may in alternate embodiments comprise tabs or grooves (not shown) in the hub 54 or the flange 52 with complimentary mating structures (not shown) formed into the bearing bracket 32. However the use of flats 40a and 54a for the rotation lock is preferred for simplicity of design and reduction of opportunities for interference between the bearing 50 and the bracket 32 during self alignment.

Because of the clearance fit between the bearing hub 54 and the receptacle 40 a slight degree of rotational freedom is available to the bearing 50, however the rotation lock substantially prevents the bearing from rotating during operation of the motor.

In the preferred embodiment a bearing retainer is provided to retain the bearing 50 in the receptacle 40. In the embodiment illustrated in FIGS. 3 to 5 the bearing retainer comprises retaining fingers 60 formed integrally with and projecting from the bridge 36 of the bearing bracket 32. Preferably the retaining fingers 60 each comprise a spring loop 62 supporting an arm 66 which terminates in a barbed tip 64 for retaining the bearing 50 against the bridge 36 of the bearing bracket 32. The engineering plastic of the bearing bracket 32 is necessarily relatively rigid, in order to maintain stability of the rotor 12, and the spring loop 62 is thus provided to impart to the retaining finger 60 sufficient resilience to displace radially (relative to the receptacle 40), as shown in phantom lines in FIG. 3, and return to the rest position, shown in solid lines in FIG. 3, after the bearing 50 has been mounted to the bearing bracket 32.

Figure 8:
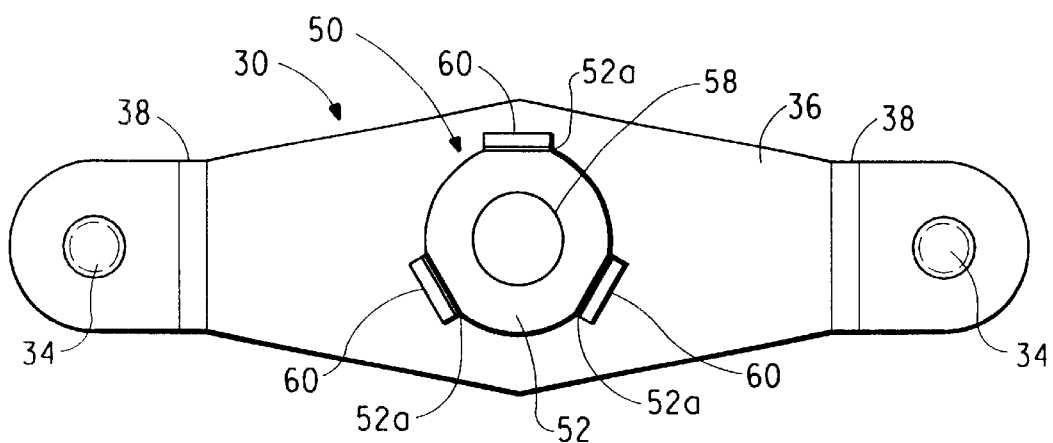
FIG. 8 is a bottom plan view of a further embodiment of the bearing system of the invention.

The retaining fingers 60 prevent the bearing 50 from falling out of the receptacle 40 during the assembly of the motor 10, as well as during operation of the motor 10. The number of retaining fingers 60 can be selected according to the size of the components. It is anticipated that in most cases two retaining fingers 60 spaced in opposition about the receptacle 40 will be adequate to hold the bearing 50 in place, however other variations are possible, for example as shown in FIG. 8.

As with the relationship of the bearing hub 54 to the receptacle 40, in order for the bearing 50 to be self-aligning there should be a small amount of clearance between the bearing flange 52 and the tips 64 of the retaining fingers 60 when the bearing 50 is fully mounted into the receptacle 40, to allow for self alignment of the bearing 50 during operation of the motor 10.

In use, the bearing 50 is mounted to the bearing bracket 32 by aligning the hub 54 with the receptacle 40 so that the flats 54a, 40a are positioned in opposition, and depressing the bearing 50 into the receptacle 40. As the flange 52 passes the barbed tips 64 of the retaining fingers 60 the arms 66 cam radially outwardly, as shown in phantom lines in FIG. 3. When the flange 52 has cleared the tips 64 the arms 66 snap back to the rest position, shown in solid lines in FIG. 3. The assembly of the bearing 50 into the bracket 32 can be performed by hand, or by automated equipment for high volume applications. The retaining fingers 66 retain the bearing 50 in the receptacle 40 as the brackets 32 are assembled to the motor 10.

The rotor 12 is positioned within the opening in the stator 12, and the bearing brackets 32 are assembled to the stator 20 by disposing the rotor shaft 16 through the bearings 50, aligning the feet 34 with holes (not shown) through the stator laminations 20 and securing the housing 30 as by bolts 34a. The motor 10 is mounted to an appliance in conventional fashion, and terminals 11 are connected to the local power supply.

In operation, as the rotor 12 rotates within the stator 20 the rotor shaft 16 rotates against the bearing surfaces 58. In the preferred embodiment no lubrication is required due to the extremely low frictional resistance and coefficient of thermal expansion of the high performance polymer used for the bearing 50. Because of the clearance fit the bearing 50 will shift to accommodate deviations in the axial pitch of the rotor 12, thereby maintaining proper alignment between the bearing 50 and the rotor shaft 16 after assembly and during operation of the motor 10. The use of plastics for both the bearing bracket 30 and the bearing 50 reduces opportunities wearing of the bearing system components, and also reduces noise and vibration levels.

A further embodiment of the invention is illustrated in FIG. 8. In this embodiment the bearing retainer comprises three retaining fingers 60 evenly distributed about the flange 52 of the bearing 50. The bearing retainer in this embodiment also provides the rotation lock, comprising in this case planar inner surfaces of the arms 66 cooperating with flats 52a disposed in complimentary relation about the periphery of the bearing flange 52. In this embodiment the bearing 50 provides a single bearing surface 58 circumscribing the inner face of the flange 52, although a fluted opening is equally available for this embodiment. As in the previous embodiment the retaining fingers 60 are spaced slightly from the bearing 50 to maintain the bearing 50 in a clearance fit within the receptacle 40, and the operation of this embodiment is otherwise as previously described.

Preferred embodiments of the invention having been thus described by way of example, it will be apparent to those skilled in the art that modifications and adaptations may be made without departing from the scope of the invention, as set out in the appended claims.

What is claimed is:

1. A bearing system for a rotating shaft having an axial pitch, comprising
   (a) a bearing comprising (i) an opening having at least one bearing surface, and (ii) a flange projecting radially from a hub,
   (b) a bearing bracket comprising a receptacle for mounting the bearing on the bracket, the receptacle being dimensioned to support the bearing with a clearance between the hub of the bearing and the receptacle, and
   (c) a rotation lock cooperating between the bearing and the receptacle to restrain the bearing against substantial rotation relative to the bracket,
   whereby when the shaft is disposed through the bearing and the shaft rotates against the bearing surface, the clearance between the hub of the bearing and the bearing receptacle enables the bearing to shift to accommodate deviations in the axial pitch of the shaft.

2. The bearing system defined in claim 1 in which the bearing is composed of a polymeric plastic.

3. The bearing system defined in claim 1 in which the rotation lock comprises at least one flat (54a) on the bearing (50) cooperating with at least one flat (40a) on the bracket (32).

4. The bearing system defined in claim 3 in which the rotation lock comprises a plurality of flats on the hub of the bearing cooperating with a plurality of flats disposed about the receptacle.

5. The bearing system defined in claim 1 in which the bracket (32) comprises a bearing retainer for retaining the bearing (50) in the receptacle (40).

6. The bearing system defined in claim 5 in which the bearing retainer comprises at least one retaining finger projecting from the bearing bracket about the receptacle and adapted to retain the flange of the bearing.

7. The bearing system defined in claim 6 in which the bearing retainer comprises a pair of retaining fingers (60) disposed in opposition about the bearing receptacle (40).

8. The bearing system defined in claim 7 in which the retaining fingers (60) each comprise an arm (66) supported by a spring loop (62).

9. The bearing system defined in claim 8 in which the arms (66) terminate in barbed tips (64).

10. The bearing system defined in claim 7 in which the bearing bracket (32) is composed of plastic and the retaining fingers (60) are formed integrally with the bearing bracket (32).

11. The bearing system defined in claim 1 in which the bearing bracket (32) is composed of plastic.

12. The bearing system defined in claim 1 in which the rotation lock comprises at least one flat on the flange of the bearing.

13. A fractional horsepower motor, comprising
   a rotor rotationally disposed in a stator, stator windings disposed about the stator for driving the rotor, and a rotating shaft, having an axial pitch, rotationally fixed to the rotor, and
   a bearing system comprising a bearing having an opening with at least one bearing surface, and a flange projecting radially from a hub, disposed in a bearing receptacle supported by a bearing bracket, the receptacle being dimensioned to support the bearing with a clearance between the hub of the bearing and the receptacle, and a rotation lock cooperating between the bearing and the receptacle to restrain the bearing against substantial rotation relative to the bracket,
   whereby when the shaft is disposed through the bearing and the shaft rotates against the bearing surface, the clearance between the hub of the bearing and the bearing receptacle enables the bearing to shift to accommodate deviations in the axial pitch of the shaft.

14. The motor defined in claim 13 in which the bearing is composed of a polymeric plastic.

15. The motor defined in claim 13 in which the rotation lock comprises at least one flat (54a) on the bearing (50) cooperating with at least one flat (40a) on the bracket (32).

16. The motor defined in claim 15 in which the rotation lock comprises a plurality of flats on the hub of the bearing cooperating with a plurality of flats disposed about the receptacle.

17. The motor defined in claim 13 in which the bracket (32) comprises a bearing retainer for retaining the bearing (50) in the receptacle (40).

18. The motor defined in claim 17 in which the bearing retainer comprises at least one retaining finger projecting from the bearing bracket about the receptacle and adapted to retain a flange of the bearing.

19. The motor defined in claim 18 in which a pair of opposed bearing fingers (60) each comprise an arm (66) supported by a spring loop (62) and terminating in a barbed tip (64).

20. The motor defined in claim 13 in which the bearing bracket (32) is composed of plastic.

21. The motor defined in claim 13 in which the rotation lock comprises at least one flat on the flange of the bearing.

22. In combination, a bearing and a bearing bracket,
   the bearing being composed of plastic and comprising a flange projecting radially from a hub, the bearing further comprising an opening having at least one bearing surface and a first component of a rotation lock, and
   the bearing bracket comprising a receptacle for mounting the bearing on the bracket, dimensioned to support the bearing with a clearance between the hub of the bearing and the receptacle, the bearing bracket further comprising a second component of a rotation lock such that the first component cooperates with the second component to restrain the bearing against substantial rotation relative to the bracket,
   whereby when a shaft having an axial pitch is disposed through the bearing and rotates against the bearing surface, the clearance between the hub of the bearing and the bearing receptacle enables the bearing to shift to accommodate deviations in the axial pitch of the shaft.

23. A bearing system for a rotating shaft having an axial pitch, comprising
   (a) a bearing comprising (i) an opening having a bearing surface, and (ii) a flange projecting radially from a hub,
   (b) a bearing bracket comprising a receptacle for mounting the bearing on the bracket, the hub of the bearing being aligned with the receptacle, the bearing bracket further comprising a bearing retainer having at least one retaining finger projecting from the bearing bracket about the receptacle for retaining the bearing in the recptacle, said retaining finger comprising an arm supported by a spring loop; and
   (c) means for enabling the bearing to shift within the receptacle to accommodate deviations in the axial pitch of the shaft when the shaft is disposed through the opening in the bearing.

24. The bearing system defined in claim 23 wherein the bearing bracket is composed of plastic and the bearing retainer is formed integrally with the bearing bracket.

25. The bearing system defined in claim 24 wherein the retaining finger is adapted to retain the flange of the bearing.

26. The bearing system defined in claim 23 further comprising a rotation lock cooperating between the bearing and the receptacle to restrain the bearing against substantial rotation relative to the bracket.

27. The bearing system defined in claim 26 wherein the rotation lock comprises at least one flat on the bearing cooperating with at least one flat on the bracket.

28. The bearing system defined in claim 26 in which the rotation lock comprises at least one flat on the flange of the bearing.

29. The bearing system defined in claim 23 wherein the bearing is composed of a polymeric plastic.

30. The bearing system defined in claim 23 wherein the surface of the opening of the bearing is truncated.

31. A fractional horsepower motor comprising a bearing system as described in claim 23.

* * * * *